April 1, 1969  L. J. BRANCATO  3,435,526
DEVICE FOR SECURING AN ARTIFICIAL TOOTH TO THE
BONE STRUCTURE OF A HUMAN JAW
Filed Feb. 13, 1967  Sheet 1 of 3
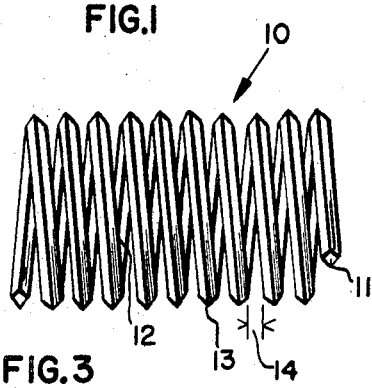
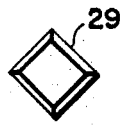
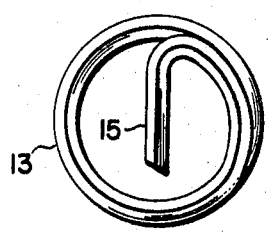
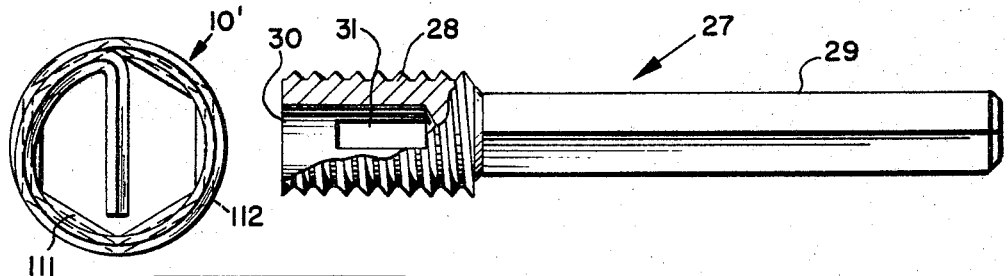
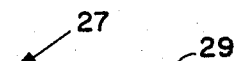
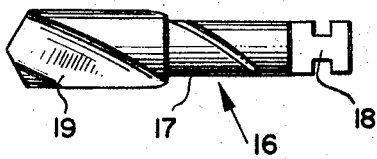
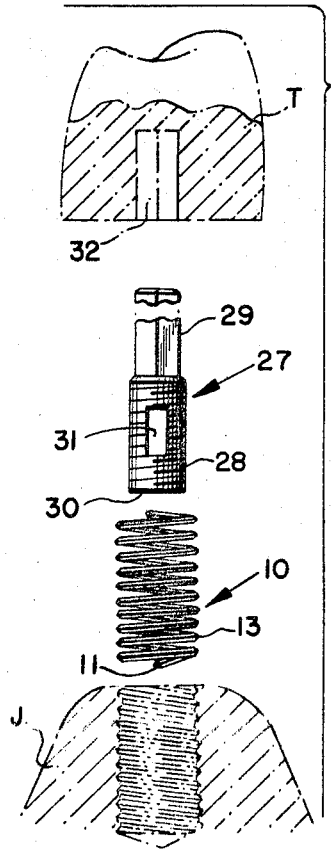
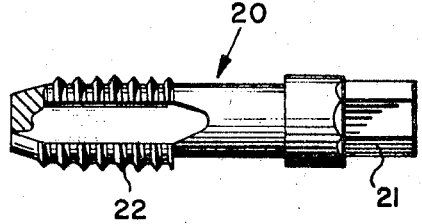
INVENTOR.
LEO J. BRANCATO
BY *Walter S. Bleston*
ATTORNEY April 1, 1969   L. J. BRANCATO   3,435,526
DEVICE FOR SECURING AN ARTIFICIAL TOOTH TO THE
BONE STRUCTURE OF A HUMAN JAW
Filed Feb. 13, 1967

INVENTOR.
LEO J. BRANCATO
BY *Walter S. Heston*
ATTORNEY

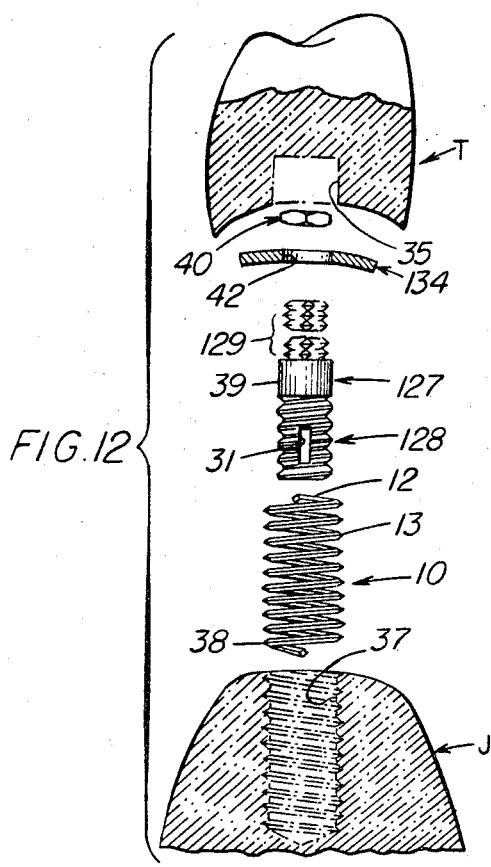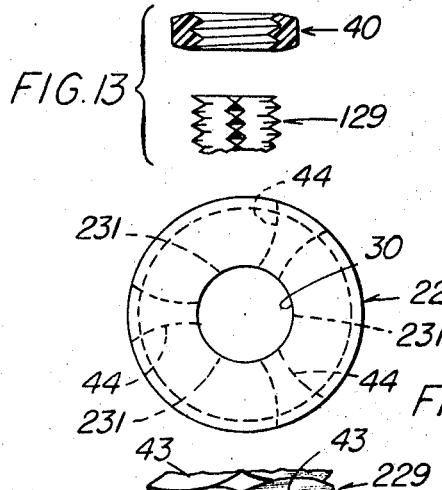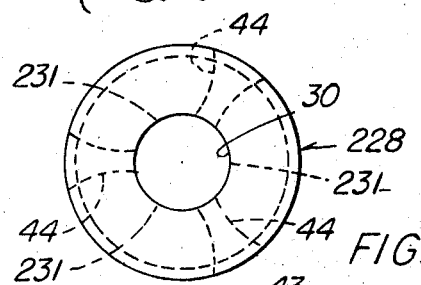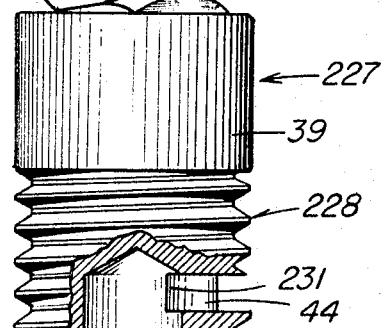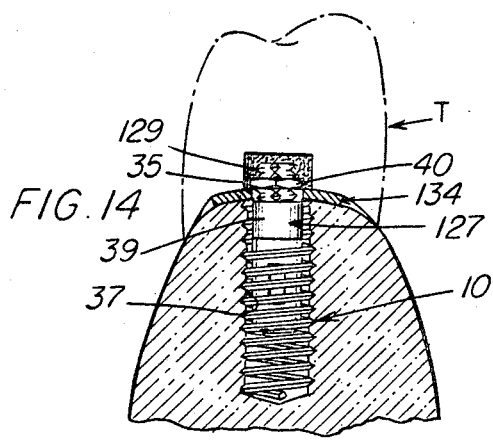

United States Patent Office 3,435,526
Patented Apr. 1, 1969

3,435,526
DEVICE FOR SECURING AN ARTIFICIAL TOOTH TO THE BONE STRUCTURE OF A HUMAN JAW
Leo J. Brancato, Danbury, Conn., assignor to Heli-Coil Corporation, Danbury, Conn., a corporation of Delaware
Continuation-in-part of application Ser. No. 497,222, Oct. 18, 1965. This application Feb. 13, 1967, Ser. No. 623,171
Int. Cl. A61c *13/22*
U.S. Cl. 32—10                     10 Claims

ABSTRACT OF THE DISCLOSURE

Devices for anchoring one or more artificial teeth to the bone of a human jaw each of which includes a stud and a wire coil implant threadably mountable into a blind hole cut into the bone and in turn threadably receives interiorly thereof an externally-threaded portion of the stud. Each stud has a noncircular stud-screwing shank to project outwardly from the teethridge for support thereon of an artificial tooth or intervening anchoring means for a plurality of the latter. The wire coil implant and stud screwed into it have interiorly thereof spaces into which bone growth may develop.

CROSS-REFERENCES TO RELATED APPLICATIONS

The present application is a continuation-in-part of United States application Ser. No. 497,222, of the same title, filed by the same applicant on Oct. 18, 1965 and now abandoned.

BACKGROUND OF THE INVENTION

The invention relates to the art of artificial teeth and more in particular to a tooth implant.

An individual tooth implant has already been proposed according to which an exteriorly serrated and interiorly tapped frusto-conical base is implanted in a correspondingly shaped bore provided in a human jaw. A stud screwed into the base carries the artificial tooth. A plurality of pins radially extending from the base enter into the bone structure and are intended to prevent rotation and/or longitudinal movement of the base. Such conventional device, however, has the disadvantage that the pins, which of necessity must be very thin, are hardly apt to prevent a movement of the base if the stud fittingly engaging the tapped thread is being screwed in so that a considerable friction is set up. A tight fit, however, between the stud and base threads is required in order to ensure a proper installation of the artificial tooth.

SUMMARY OF THE INVENTION

The device of the present invention comprises a substantially cylindrical wire coil implant of resilient wire having a cross section that will provide the coil with an interior screw thread and an exterior screw thread, such as of diamond-shape in cross section, and a stud having an exteriorly threaded portion screwed into the interior thread of the coil implant and a shank of noncircular cross section to be engaged by a torque-applying tool for screwing the stud into and out of the wire coil implant and for anchoring one or more artificial teeth thereto.

The composite implant is achieved in two stages.

In one form the first stage may comprise three steps, namely, first, cutting or drilling a blind hole into the teethridge of the jaw to a preestablished diameter and depth, secondly, tapping the hole to a diameter slightly less than the free outside diameter of the implant coil, and thirdly, screwing the implant coil, while slightly contracting it, into the tapped hole in the jaw. Preferably tools provided for their special purposes will be used for the three steps. The implanted coil is then ready to receive the stud, as the coil springingly and securely seats in the thread convolutions of the tapped hole in the jaw. Where tissue and bone into which the implant is to be made are of such nature as to permit practice of a simpler procedure the profile of the implant coil or a portion thereof may be such as to allow the coil to be seated in a threadably engaging manner directly into an appropriately sized blind hole drilled into the bone of the teethridge, as another form of the first stage.

The second stage includes screwing an externally-threaded portion of the stud into the implanted wire coil, using a wrench to apply torque to a noncircular shank extending outwardly from the threaded portion of the stud. The stud may be firmly seated. As the stud shank usually projects excessively it can be trimmed in harmony with the height of adjacent teeth and normal mouth formation. An important feature of the present invention is the ability to remove the stud at this stage as many times as is necessary for alteration without disturbing the jawbone since the implanted coil serves as a protective liner.

It is thus an object of the present invention to provide means for anchoring securely an artificial tooth to the bone structure of a human jaw which means avoids the disadvantages of the earlier conventional structure.

Another object of the present invention is the provision of means to ensure an intimate engagement of a stud with an implanted interiorly and exteriorly screw threaded insert of wire coil form which will remain solidly implanted in the bone of the jaw.

A further object is to provide the wire coil implant and threadably received stud in forms which provide spaces therein into which bone growth is encouraged for ultimate solid anchorage of the composite implant while avoiding development of infection.

BRIEF DESCRIPTION OF THE DRAWINGS

Other objects of the invention will in part be obvious and will in part appear from reference to the following detailed description taken in connection with the accompanying drawings, wherein like numerals identify similar parts throughout, and in which:

FIGS. 1 and 2 are side elevation and leading end views, respectively, of one embodiment of an implant coil according to the invention;

FIG. 3 is a top plan view of a modified implant coil;

FIGS. 4 and 5 are a side elevation and end view, respectively, of a stud, partly in section, which may be threadably anchored into the implant coils of FIGS. 1 to 3 inclusive;

FIG. 6 is an exploded view of a completed implant, a section of the teethridge of a jawbone and an artificial tooth being indicated in broken lines in addition to the parts of FIGS. 1 and 4;

FIGS. 7 and 8 are side elevations of a drill and a tap, respectively, as may be used in the installation of certain forms of the present invention;

FIG. 12 is an exploded view similar to FIG. 6 showing a modified form of anchorage for one or more artificial teeth, such as may be used to provide a modified form of the dental bridge depicted in FIGS. 10 and 11;

FIG. 13 is an exploded view of a portion of the shank of the stud and the nut threadably mountable thereon, shown in FIG. 12;

FIG. 14 is a sectional view similar to FIG. 11, showing the assembly of the parts depicted in FIG. 12;

FIG. 15 is an enlarged side elevational view of a modified form of the stud shown in FIGS. 12 and 14, with a tip portion of the shank broken away and parts of the sides of the externally-threaded portion thereof broken away and sectioned; and FIG. 16 is a plan view of the bottom or leading end of the stud of FIG. 15.

DESCRIPTION OF THE PREFERRED EMBODIMENTS

Figure 9:
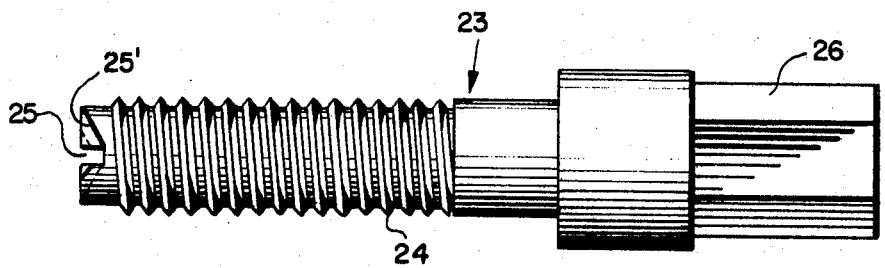
FIG. 9 is a side elevation of a tool which may be used for installing the implant coils of FIGS. 1 to 3 inclusive.

It will be understood that the scale of the figures of the drawings is greatly exaggerated for the sake of better clearness as, e.g., the diameter of the coil of FIG. 1 will actually be not larger than about one-fifth of an inch.

Referring now to the drawings, the wire coil implant of FIGS. 1 and 2 is of a material acknowledged as suitable for implantation in human tissue, e.g., a stainless steel, preferably tempered for relatively high resiliency. The coil 10 preferably is helically wound of a resilient wire that is diamond-shaped in cross section, as is visible at 11, so as to form the required interior and exterior screw threads 12 and 13. However, the wire of coil 10 may be of other cross-sectional shapes so long as it will provide in the coil the requisite external and internal screw threads. The successive convolutions of wire coil 10 preferably are spaced by gaps 14 which when the coil has been implanted into a correspondingly drilled and tapped hole of the jaw, allow regrowth of bone through the intervening spaces, thereby knitting or interlocking together the coil 10 and the stud of FIG. 4. The end turn of the coil 10 which leads upon insertion is provided with a diametral tang 15, as is best seen in FIG. 2, which serves the dual purpose of a grip or driving element for engagement by an inserting tool introduced through the interior of the coil, and of an anchor if after the implant bone growth surrounds the tang as is intended.

A modified form of the wire coil implant is shown at 10' in FIG. 3 wherein the coil is shown as having several chordal portions 111 in one or more of its convolutions. The corners 112 of the portions 111 tend to bite into the bone structure thereby still more firmly anchoring the implant coil in the jaw, and the chordal portions proper will hold a stud screwed into the coil with increased friction. The corners 112 may also serve to cut threads into the bone defining the sidewalls of the blind hole drilled in the jawbone teethridge as the coil 10 is rotatably advanced into this hole.

In order properly to implant either of the coils 10 and 10' it is recommended to drill the blind hole in the teethridge of the jawbone in two steps, using first a conventional dental burr and then a special drill 16 of the type illustrated in FIG. 7, the diameter of the burr being smaller than that of the drill. This drill is essentially a two-flute conventional drill having modifications of its shank 17 so as to make its shank end 18 fit into chucks of high speed dental drills. The length of the major diameter portion or bit 19 of the drill 16 has been selected to conform with the necessary depth of penetration of the blind hole so that it serves as an indicator to the dentist.

A tap 20 which may be applied to the drilled blind hole is shown in FIG. 8. This tap 20 conforms to conventional tap design with the exception of its polygonal, e.g., octagonal, shank end 21 which allows rotation by a miniature ratchet wrench (not shown). The length of the threaded tap portion 22 of tap 20 also provides a depth indication to the dentist.

In order to install the implant coil, such as 10 or 10', into the tapped hole an inserting tool 23, like that shown in FIG. 9, may be used. This tool is threaded at 24 to receive thereon the coil, such as that shown at 10 in FIGS. 1 and 2. A slot 25 is provided in the front end to grip the tang 15 of the coil. This slot may have inclined sidewalls 25' to permit the tang to leave the slot upon a reverse rotation of the tool which upon a forward rotation will screw the coil into the tapped blind hole for which purpose the tool end 26 is of polygonal cross section, which may be octagonal similar to the end 21 of the tap 20 of FIG. 8. The threadably seated wire coil implant serves as an internally-threaded socket for threadable anchorage therein of an externally-threaded stud.

The stud 27 shown in FIG. 4 has an exteriorly screw-threaded portion 28 which fits the interior or internal thread of the implant coil 10 when the latter is installed as a socket-defining structure in the blind hole cut or drilled in the teethridge of the jawbone. The shank portion 29 thereof is of an excessive length to be trimmed in each instance to the required length. The cross section of the shank is noncircular, in fact, square, but it may as well be of any polygonal cross section, such as octagonal as is the end 21 of the tool of FIG. 8 and the end 26 of that of FIG. 9, so as to fit the same chuck of the aforementioned wrench. It will be noted that the threaded portion 28 is provided with a longitudinally-extending hole or axial blind bore 30 extending from its leading end appreciably toward the juncture with the shank 29, preferably being of certain depth, and a transverse hole that may be in the form of a rectangular slot 31, which may extend diametrically through portion 28 substantially at the inner end or bottom of the bore 30. These openings or holes provide appreciable spaces and entrances and exits leading to and from the latter in the externally-threaded portion 28 of the stud 27 which have been found necessary for the initial acceptance of the implant by the jaw, allowing proper healing without fever or infection. They also provide for subsequent interlocking of new bone growth thereby for reliably securing the composite implant.

The exploded view of FIG. 6 will be self-understood in view of the foregoing. It shows a portion (J) of the teethridge of a human jawbone, the implant coil 10, stud 27 and an artificial tooth (T) having its base provided with a recess 32 into which the properly trimmed shank 29 of the stud can be cemented. The recess 32 may be in the form of a socket of a cross sectional shape similar to that of stud shank 29.

Figure 10:
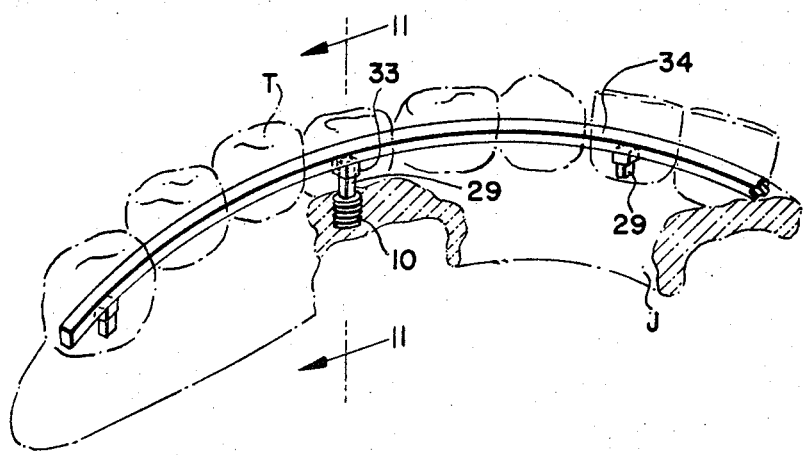
FIG. 10 is a pictorial representation of one form of a portion of a dental bridge using a plurality of the present devices, parts being broken away and a section of the teethridge of a jawbone and a plurality of artificial teeth being indicated in broken lines.
Figure 11:
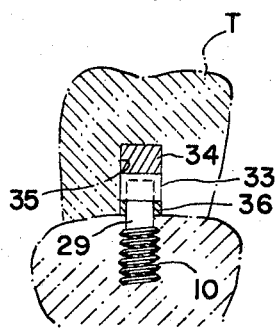
FIG. 11 is a section along line 11—11 of FIG. 10.

If it is desired to provide an entire dental bridge or at least a major portion of such bridge with the aid of implants according to the invention, it is not necessary to apply an implant for each individual tooth. In most instances a small number of about six implants distributed over the extension of the teethridge of the jawbone will be sufficient for a complete bridge. In such an event, the free ends of the implant studs are to be connected by a common bar which then will serve as a carrier of the artificial teeth. For this purpose one may proceed in a manner which is illustrated in FIGS. 10 and 11. FIG. 10 shows at (J) approximately half of a lower jaw, partly in section, and a set of artificial teeth (T) secured to this jawbone section with the aid of a plurality of the FIG. 6 implants and a bar, and FIG. 11 is a section through one of the artificial teeth, a composite implant and the bar. First, wire coil implants of the type just described, such as coil 10, and in the required number, in the present case three for a half section of a jawbone, will be installed in the teethridge of the jaw (J) in the described manner, and then studs 27 with the stud shanks 29 trimmed to the desired length are screwed thereinto. The shanks are, then, provided with metal caps 33 which may be slip-fitted or secured thereon in any suitable manner. A mold (not shown) of the jaw is taken in which the caps are embedded. The mold with the caps therein will be removed from the patient's mouth and a metal bar 34 of any suitable cross-section and bent according to the shape of the jawbone will be soldered or otherwise secured to the caps whereupon the bar with the caps will be removed from the mold. The metal of the caps 33 and bar 34 will be of a type compatible with human tissue and well-known in the art. The caps with the bar thereon will then be cemented on the corresponding ends of the studs. Finally, the several artificial teeth, each of which is cross slotted at 35, so that they receive the bar in these slots, are cemented to the bar, the cement 36 filling any open space of the slots so that there do not remain any cavities. This sequence of steps is preferred although it is also possible to cement the artificial teeth to the bar after the caps have been soldered thereto but before they are cemented to the studs.

In the modified form shown in FIGS. 12 to 14 inclusive the internally threaded blind hole 37 in the teethridge of the jawbone (J) is to receive threadably a wire coil implant of the type described above, such as that indicated at 10 in FIGS. 1 and 2, the leading end turn 38 of this wire coil preferably being provided with the transverse tang 15. The stud 127 has an externally-threaded portion 128, similar to that illustrated at 28 in FIG. 4, and thus is provided with a longitudinally-extending blind hole or axial bore with which are communicated a plurality of transverse slots 31. The externally-threaded portion 128 of the stud 127 carries, preferably coaxially thereof, a shank 129. The shank 129 may be polygonal in cross section for engagement thereof by a torque-applying tool, such as a wrench, and for this purpose its cross section may be substantially square. This shank 129 is externally threaded and, due to the polygonal cross section thereof, the threads are circumferentially interrupted with the torque-applying tool engaging areas or flat faces intervening full depth thread sections. The externally threaded portion 128 of the stud 127 and its externally-threaded, noncircular shank 129 may be intervened by a medial cylindrical or unthreaded portion 39. At least one internally-threaded element, such as a hexagonal nut 40, which may be made of human body-compatible plastic material, e.g., nylon, is provided for threadable mounting upon the externally-threaded shank 129.

When such an implant assembly is to be employed for anchorage of a full or partial denture, such as that illustrated in FIG. 10, a tooth-supporting bar of the type there illustrated may be provided to be mounted upon the shanks 129 of the plurality of studs 127. For this purpose, such bar, a section of which is shown at 134 in FIG. 12, may be provided with a plurality of holes 42 each of which is slidably to receive therethrough one of the stud shanks 129. The bar 142 is mounted upon such stud shanks 129 by insertion of the outer end of each through the proper one of the holes 42. The bar 134 is then firmly anchored to these stud shanks 129 by threadably mounting an outer nut 40 upon the tip end of each such shank that projects above the bar. Each of the resulting implant assemblies will thus be in the form illustrated in FIG. 14.

The individual artificial teeth (T) are then mounted upon the stud shank and nut assemblies (one of which is shown in FIG. 14) and the bar 134 carried thereby in the manner described above in connection with FIGS. 10 and 11, such as by filling with cement the voids in the cross slots 35 formed in the bases thereof.

The noncircular shanks 129 of the studs 127 may first be given their desired noncircular shape in cross section before cutting sections of threads on the diametrically wider portions thereof, e.g., each may first be made polygonal in cross sectional shape and then interrupted threads cut thereon by a suitable circular die so that no thread roots are provided on the mid zones of the torque-applying tool engaging areas intervening full depth thread sections. However, each stud shank 129 initially may be circular in cross section and after being externally threaded flats 43 may be ground on longitudinally-extending side zones thereof for tool engagement, as is illustrated at 229 in FIG. 15.

The externally-threaded portion 228 of stud 227, illustrated in FIGS. 15 and 16, may be provided with the longitudinally-extending hole in the form of blind bore 30 and the transverse holes which communicate therewith may be staggered both circumferentially and axially, as is illustrated at 231 in FIG. 15. As will be understood from FIG. 16 such transverse holes may be in the form of three slots 231 each communicating with the axial bore 30 at points angularly spaced about 120° apart. Each of the slots 231 may be formed by a small rotary cutter to cut an arcuate kerf 44 in the sidewall of the externally-threaded portion 228 which breaks through to communication with the axial bore 30 to form the intercommunicating opening. It will thus be seen that, while it may be preferred to provide transverse openings or holes in the sidewall of the externally-threaded stud portion 228 by a cross slot, such as 31 shown in FIGS. 4 and 12, such transverse openings or holes need not be diametrically aligned.

In some instances, where tissue and bone of the teethridge are of proper nature and the profile of the implant coil or a portion thereof is of a suitable profile the coil may be anchored in a threadably engaging manner directly into an appropriately sized blind hole drilled into the bone. In such a case the need for cutting internal threads in the drilled blind hole and then threadably seating the wire coil implant into the internally-threaded hole may be dispensed with. Thereafter, the externally-threaded portion of the denture anchoring stud may be threadably mounted into the seated implant coil in the manner described above.

Thus, one or more devices of the present invention for securing an individual artificial tooth or portion of a partial or full denture to the bone structure of a human jaw comprises a substantially cylindrical coil of a diamond-shaped resilient wire, having interior and exterior thread-forming convolutions, is screwable into a blind hole or tapped bore in the jawbone for screw anchorage therein, and an exteriorly screw-threaded stud portion is screwable into this anchored coil. This stud also has a shank of, preferably noncircular in cross section, to be anchored into a recess in the base of an artificial tooth and its screw-threaded portion is provided with a longitudinally-extending hole and a plurality of transverse holes in its sides communicating with the latter. If a complete dental bridge or a portion thereof is to be produced, a plurality of these devices, such as described hereinbefore, is provided and the shanks of the studs thereof are connected by a common bar bent according to the shape of the teethridge of the jaw and serving as a carrier of the artificial teeth.

Having described my invention, what I claim as new and desire to secure by Letters Patent is the novel subjects matter defined in the following claims:

1. A device for securing one or more artificial teeth to the bone structure of a human jaw comprising:
   (i) an implant base member adapted to be anchored in a blind hole cut generally vertically into the teethridge of the jawbone with said base member provided with an internally-threaded socket, and
   (ii) a tooth anchoring stud having an externally-threaded anchoring portion adapted to be threadably engaged in said internally-threaded base member socket and having a leading inner end with said stud being provided with a tooth supporting portion; wherein the improvement comprises:
      (a) an interior and exterior thread-forming and substantially cylindrical, resilient wire coil implant comprising a plurality of successive convolutions with one constituting a leading end turn, said wire coil implant serving as said base member with the interior thread thereof defining the internally-threaded socket and with its exterior thread adapted to be threadably anchored to bone of the jaw defining the sidewalls of said blind hole,
      (b) the tooth supporting portion of said stud being in the form of a shank extending outward from said externally-threaded anchoring portion to be exposed beyond said teethridge when this anchoring portion is screwed into said internally-threaded socket for anchorage in a recess in the base of such artificial tooth, and (c) said externally-threaded anchoring portion of said stud being provided with a longitudinally-extending hole extending from its leading inner end appreciably toward said shank and a plurality of holes extending transversely through the sides of said anchoring portion to communication with its longitudinally-extending hole so as to permit bone growth therein.

2. The artificial tooth anchorage device of claim 1 in which said stud shank comprises a portion that is noncircular in cross section for engagement by a torque-applying tool to facilitate screwing said stud into said wire coil implant.

3. The artificial tooth anchorage device of claim 1 in which said stud shank is externally threaded so that it will threadably carry tooth anchoring means thereon.

4. The artificial tooth anchorage device of claim 3 in which said stud shank is noncircular in cross section and the external threads thereof are circumferentially interrupted providing torque-applying tool engaging areas intervening full depth thread sections, said tooth anchoring means comprising an interiorly-threaded nut threadably engaged with the full depth thread sections.

5. The artificial tooth anchorage device of claim 1 in which said longitudinally-extending hole in said externally-threaded anchoring portion of said stud is a coaxial blind bore and said transversely-extending holes therein comprise a pair of diametrically-aligned slots communicating with said bore.

6. The artificial tooth anchorage device of claim 1 in which said wire coil implant is formed of wire that is diamond-shaped in cross section.

7. The artificial tooth anchorage device of claim 1 in which the successive convolutions of said wire coil implant are spaced longitudinally from each other so as to permit bone growth therebetween.

8. The artificial tooth anchorage device of claim 1 in which one of the wire coil implant convolutions includes at least one chordal portion.

9. The artificial tooth anchorage device of claim 1 in which the leading end turn of said wire coil implant terminates in a transversely-extending tang to be engaged by a driving tool from the interior of said coil for screwing it into the blind hole in the jawbone and to constitute an anchor of said implant upon growth of bone thereabout after insertion of said implant.

10. The artificial tooth anchorage device of claim 1 having in combination therewith at least another one such anchorage device and a common bar-like member shaped transversely to conform generally to the curvature of at least a section of the teethridge of a jaw supportable by and anchorable upon the shanks of said studs, said bar-like member being adapted in turn to be received and fixed in transverse slots in the bases of a plurality of artificial teeth.

References Cited
UNITED STATES PATENTS

| | | | |
|---|---|---|---|
| 2,599,044 | 6/1952 | Brennan | 32—2 |
| 2,644,231 | 7/1953 | Brennan | 32—2 |
| 2,745,180 | 5/1956 | Kiernan | 32—10 |
| 2,857,670 | 10/1958 | Kiernan | 32—10 |

ROBERT PESHOCK, *Primary Examiner.*